March 10, 1953      B. F. B. SMITH      2,631,249

DIRECT CURRENT TRANSFORMER

Filed May 17, 1951      4 Sheets-Sheet 1

INVENTOR.

March 10, 1953  B. F. B. SMITH  2,631,249
DIRECT CURRENT TRANSFORMER
Filed May 17, 1951  4 Sheets-Sheet 3

INVENTOR.

March 10, 1953  B. F. B. SMITH  2,631,249
DIRECT CURRENT TRANSFORMER
Filed May 17, 1951  4 Sheets-Sheet 4

INVENTOR.

Patented Mar. 10, 1953

2,631,249

UNITED STATES PATENT OFFICE 2,631,249

DIRECT CURRENT TRANSFORMER

Burton F. B. Smith, Madison, N. J.

Application May 17, 1951, Serial No. 226,845

9 Claims. (Cl. 307—110)

This invention relates to a direct current transformer of the type which employs the repetitive charging and discharging of capacitors to either raise or lower electric potential. The invention has particular reference to the arrangement of capacitors and to the sequential program of charging these capacitors so that a maximum voltage ratio may be obtained with a minimum loss.

Several prior art disclosures have illustrated circuits for doubling the voltage of a source, and in many cases the transformation circuit was employed to lower the voltage of a high voltage transmission line to a value which could be employed in domestic lighting circuits. Several of the prior art disclosures connected capacitors in series arrangement permanently, and sequentially connected individual capacitors to an output circuit to obtain a lower voltage. Another prior art arrangement comprised a circuit in which three condensers were first charged in parallel arrangement and then dscharged to an output circuit in series.

All the above circuits are limited in use because of the fact that the input circuit and the output circuit are not entirely disconnected at any time and it is always possible for some of the accumulated charge to flow back to the source of electrical power.

The circuit herein described uses a novel form of switching arrangement which comprises two or more multiplier stages and performs the switching operations in such a manner that the alternate stages may be completely isolated from each other. This insures against the possibility of current flowing from the load toward the battery and also permits multiple grounds. The transformer circuit also includes the use of a gear switch in conjunction with the multiplier stages to definitely fix the correct time relationship between contact points in the various stages. The gear type of switch also provides improved insulation between stator contact points.

One of the objects of this invention is to provide an improved direct current transformer circuit which avoids one or more of the disadvantages and limitations of prior art arrangement.

Another object of the invention is to obtain the maximum possible voltage multiplication with the smallest number of capacitors and the smallest number of contact points.

Another object of the invention is to provide a high voltage system which can be used with cathode ray vacuum tubes and, in particular, with television picture tubes for providing the anode voltage necessary for their successful operation.

The invention comprises a source of direct current, a plurality of capacitors arranged in groups of two or more, and a switching system. The switching arrangement charges each capacitor in the first group in sequential order. A second part of the switching arrangement charges the second group capacitors also in sequential time intervals, but the charging intervals of the second set are out of phase with the first so that neither set is being charged at the same time. Power for charging the second set is obtained from the voltage provided by the first capacitors in series arrangement. A third set of capacitors may also be charged, one at a time, in sequential manner with the charging times of the third set coinciding with the charging times of the first set; or the charging interval of the third may differ from both the first and second. The output circuit may contain a parallel capacitor for storing the generated high voltage. As many stages as desired may be used to multiply the voltage of a source. The ratio of transformation is equal to the number of capacitors in each stage raised to a power equal to the number of stages. For example, if three capacitors are used in three stages, the ratio of transformation is 1:27.

For a better understanding of the present invention, together with other and further objects thereof, reference is made to the following description taken in connection with the accompanying drawings.

Figure 1:
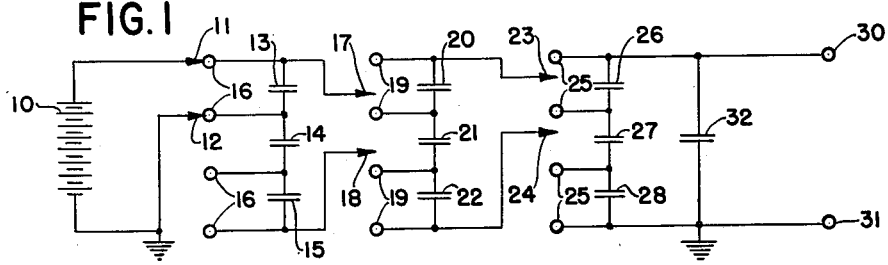
Fig. 1 is a simplified schematic diagram of connections showing the circuit in one charging position.
Figure 2:
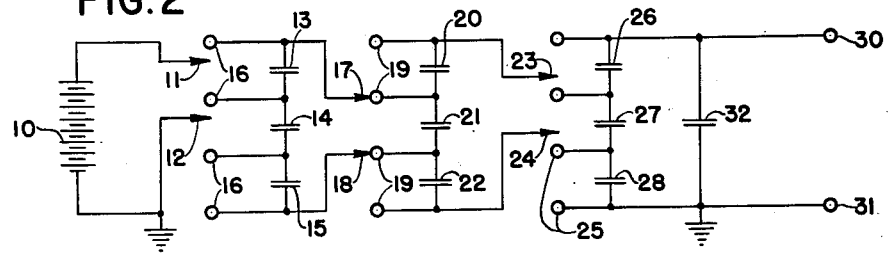
Fig. 2 is a similar diagram of connections showing the same circuit, but with the contact points indicating a second interval in the charging cycle.

Referring now to Figs. 1 and 2, a source of potential 10 is connected between two contact points 11 and 12. Three capacitors 13, 14, and 15 are connected in series, but contact points 16 are provided so that the capacitors may be charged individually. A second set of contact points 17 and 18 are connected across the end points of capacitors 13 and 15 and are arranged to make contact with a second set of four points 19. A second set of three capacitors 20, 21, and 22 is arranged in a manner similar to the first set. Contact points 23 and 24 make contact with four points 25 in the same manner as contact points 11 and 12 made with points 16. The third set of capacitors 26, 27, and 28 are connected in a similar manner and their end points are connected to output terminals 30 and 31. An output capacitor 32 is bridged across the output terminals.

In Fig. 1, contacts 11 and 12 are shown making contact with the points which are connected across capacitor 13, contacts 17 and 18 in the second stage and contacts 23 and 24 in the third stage are shown between contact points with no connection to the next stage.

Fig. 2 is designed to indicate the position of the contact points a short interval of time after the condition shown in Fig. 1. Contacts 11 and 12 have moved away from points 16, and contacts 23 and 24 have moved closer to the middle pair of points. Contacts 17 and 18, however, are now shown connected to the middle set of contact points 19, thereby charging capacitor 21 to whatever potential the series arrangement of the first set had available.

During the next interval of time contact points 11 and 12 will move closer to the middle set of points 16, contacts 17 and 18 will move away from points 19, and contacts 23 and 24 will connect with the middle set of points 25, thereby charging the middle capacitor 27.

The above described system of charging and discharging will proceed as outlined until all contact points have made a number of excursions across the points 16, 19, and 25 to charge the capacitors with whatever potential is available in the charging circuit. It will be evident that when first started there is very little potential available at the output terminals 30, 31, and that a plurality of charging cycles are necessary before the proper voltage transformation is available. However, after several cycles, the first set of capacitors 13, 14, and 15 is charged to the potential of the battery 10 and the voltage appearing on contacts 17 and 18 is approximately three times the battery voltage, this potential applied to capacitors 20, 21, and 22 sequentially will charge each of these capacitors to three times the battery voltage. Contacts 23 and 24, therefore, are at a voltage nine times the battery 10, and after successive charging intervals, capacitors 26, 27, and 28 are each charged to a potential approximately nine times the battery voltage. The terminal points 30, 31 and the storage capacitor 32 are, therefore, charged to a potential approximately twenty-seven times the battery voltage. This condition exists when no current is being drawn from the output terminals.

When the terminals 30, 31 are short circuited, the maximum current flows through the shorted connection. This current may be easily calculated from the capacities used and the charging rate. Let it be assumed that the circuit shown in Figs. 1 and 2 is used and the charging cycle rate is 30 per second, and it is determined to produce a short circuited current of 4 milliamperes. Then the battery or input current must be 27 times 4 or 108 milliamperes. Assuming a battery potential of 500 volts, the capacity of the three capacitors 13, 14, and 15 will be $$C = \frac{I}{3Ef} = \frac{.108}{3.500.30} = 2.4 \times 10^{-6}$$

where I is the charging current in amperes, C is the capacity in farads, E is the voltage of the battery, and $f$ is the frequency of the charging cycle. With a 500-volt source, the no load voltage is 27 times 500 or 13,500 volts.

In order to derive maximum power from such a circuit, a load must be used which permits one-half of the short circuit current to flow at one-half the open circuit voltage. This condition, assuming the values given above, produces a current of 2 milliamperes and a terminal voltage of 6,750 volts. The power consumed by this load is 13.5 watts and the load resistance is 3,375,000 ohms.

The capacitors required for such a transformer circuit are:

| Stage | Capacity in Microfarads | Working Voltage |
| --- | --- | --- |
| 1 | 2.40 (13, 14, 15) | 500. |
| 2 | .27 (20, 21, 22) | 1,500. |
| 3 | .03 (26, 27, 28) | 4,500 (no load). |
| 3 | [1] .27 (32) | 13,500 (no load). |

[1] Indeterminate value.

As long as a load is permanently connected to the circuit, the working voltages of the capacitors in the third stage will be divided by two.

Figure 3:
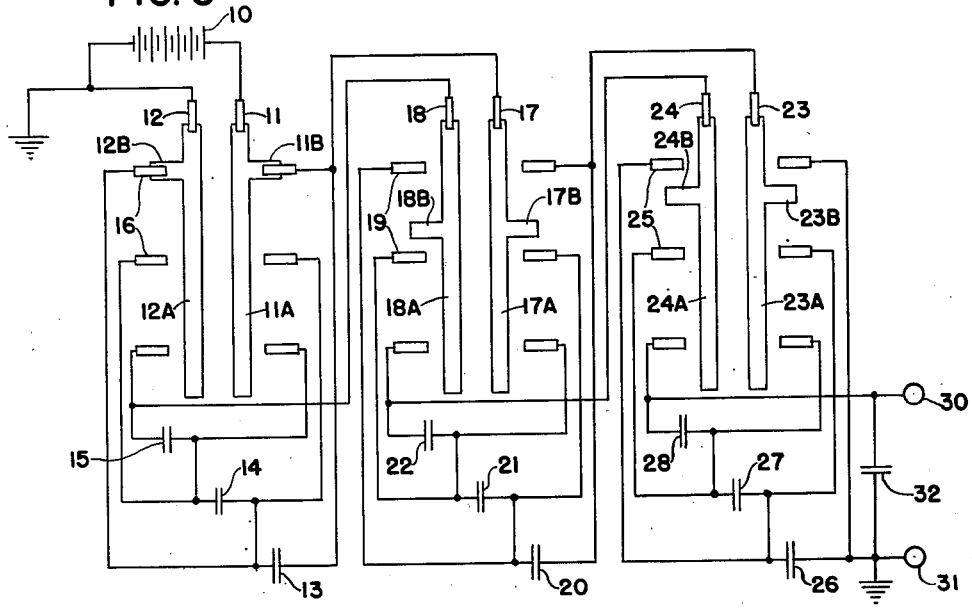
Fig. 3 is a schematic diagram of connections showing how the circuits of Figs. 1 and 2 may be adapted for operation with a drum commutator.

The circuits shown in Figs. 1 and 2 are diagrammatic, and do not show a structural means of performing the switching operation. Fig. 3 indicates one means of switching the circuits which employs a cylindrical drum or other rotating device which is composed of insulating material except for a series of conducting slip rings 12A, 11A, 18A, 17A, 24A, and 23A. These slip rings are shown in development form; the vertical length of each is assumed to be a closed conducting ring on the surface of the drum. Each slip ring makes contact with its associated brush 11, 12, 17, 18, 23, or 24 at all times, and an extension 11B, 12B, etc., makes momentary contact with the capacitor brushes as the drum revolves. It should be obvious that the resulting action is the same as the action described in connection with Figs. 1 and 2, and the result will be the same.

Figure 4:
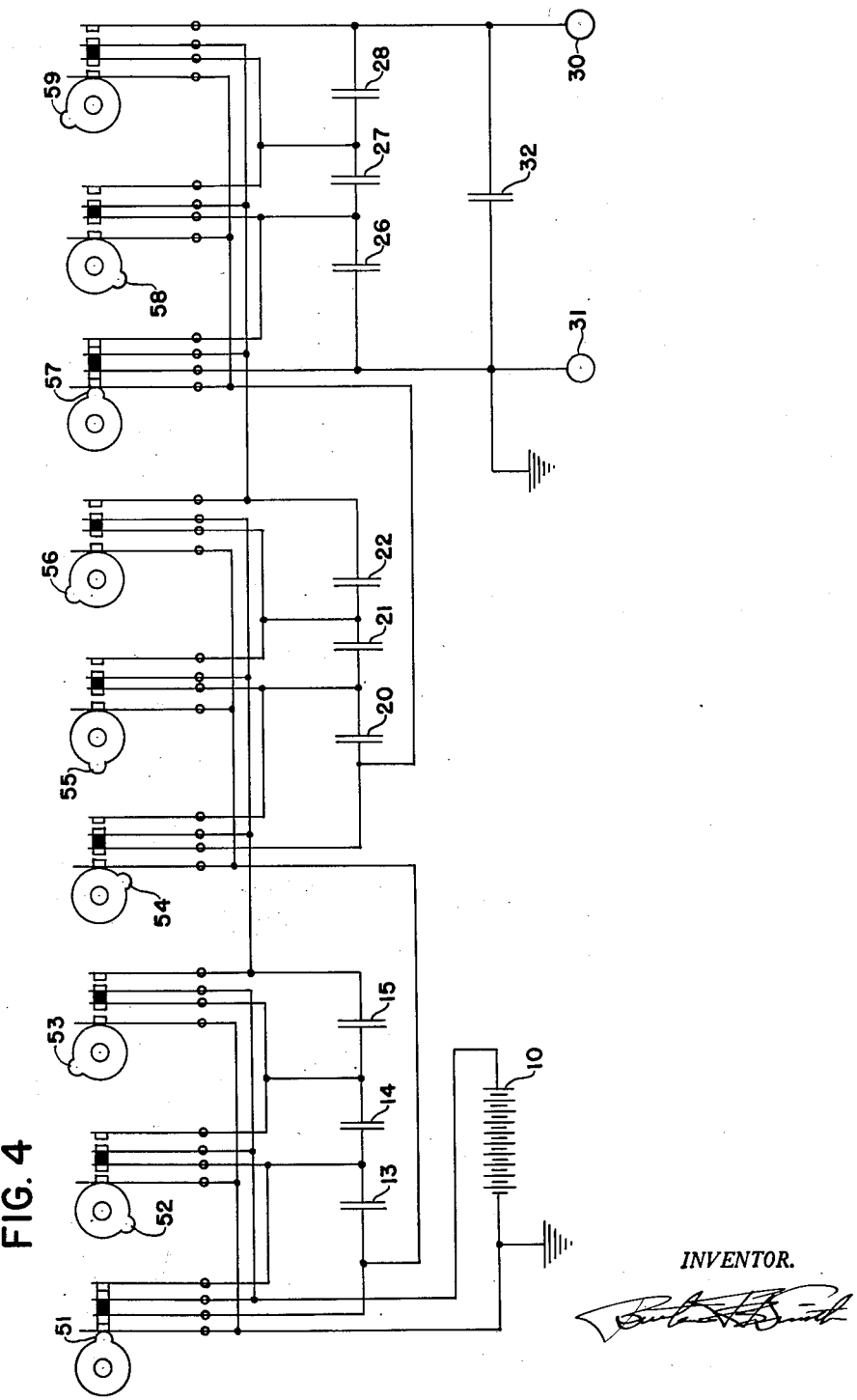
Fig. 4 shows an alternate method of charging the condensers by the use of spring contact points operated by rotary cams.

Fig. 4 is another structure which employs the same circuit and produces the same result, but uses a different structure to actuate the switch contacts. In this design the contacts are made and broken by a series of leaf springs actuated by a series of cam elements which may be secured to a single rotating shaft. Cam elements 51 to 59, inclusive, are spaced around the periphery of a rotating drum (or series of disks). They are made of insulating material or are carefully insulated from each other, and in rotating, make the contacts in the correct sequence to produce the same action as described in Figs. 1 and 2.

Figure 5:
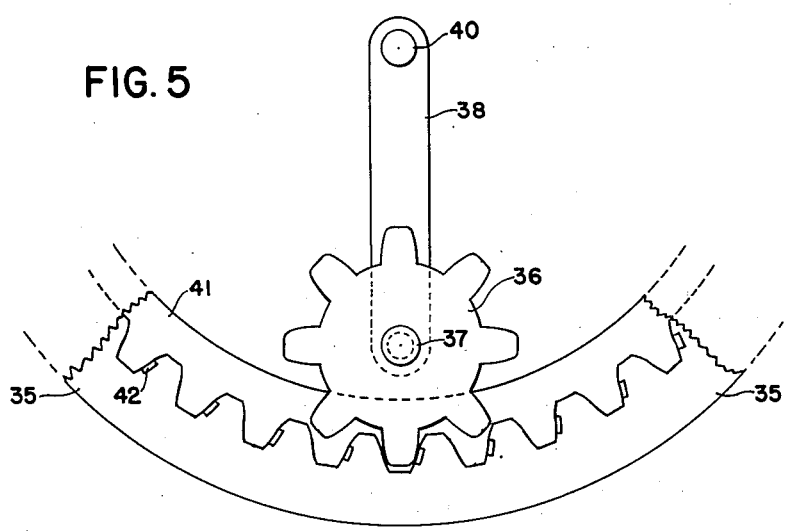
Fig. 5 shows an alternate form of contact device using gears.
Figure 6:
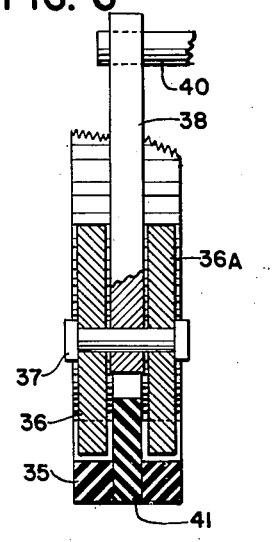
Fig. 6 is a cross sectional view of the contact arrangement shown in Fig. 5, taken along line 6—6 of that figure.
Figure 7:
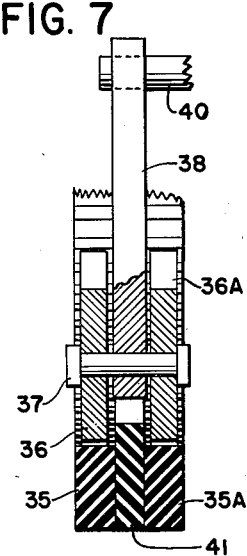
Fig. 7 is a cross sectional view similar to Fig. 6, but taken along a line which bisects a tooth on the ring gear.

The important, and sometimes the limiting, factors in this type of circuit are the mechanical means for switching between stages. The switches should make positive contact and have a long life. They should be capable of operating at speeds of at least 60 cycles per second and must be designed to withstand the high voltages used. Several switching means have been tried, the most successful being the type shown in Figs. 5, 6, and 7. This is a gear switch and includes an internal ring gear 35 and a planetary gear 36. The planetary gear is mounted on a short shaft 37 which in turn is secured to an arm 38 which is fast on a shaft 40. Shaft 40 rotates about its axis which is also the center of the ring gear 35, and during the rotation the planetary gear travels around a small orbit and is turned on its own shaft 37 by meshing with the teeth on the ring gear. It has been found convenient to mount two planet gears on the same shaft 37, one on each side of the arm 38. Two ring gears are mounted in parallel alignment with an insulating spacer 41 between them. All the planetary gears are made of conducting material and connect conductive inserts 42 on either side of the spacer 41.

The above described gear switch provides a sliding contact between the conductive points to keep the surfaces free from dirt and oil film. Also, if there is a tendency to wear, the conductive particles cannot be carried along the surface of the insulating mounting to form a short circuit because the conductive contacting material in the planet gear slides for only a short distance on the intermediate insulator surface. The breakdown voltage is high because of the intervening spacer ring 41, and the operating life is long because with the modern gear design there is no rubbing except a minor sliding action along the sides of the teeth.

Figure 8:
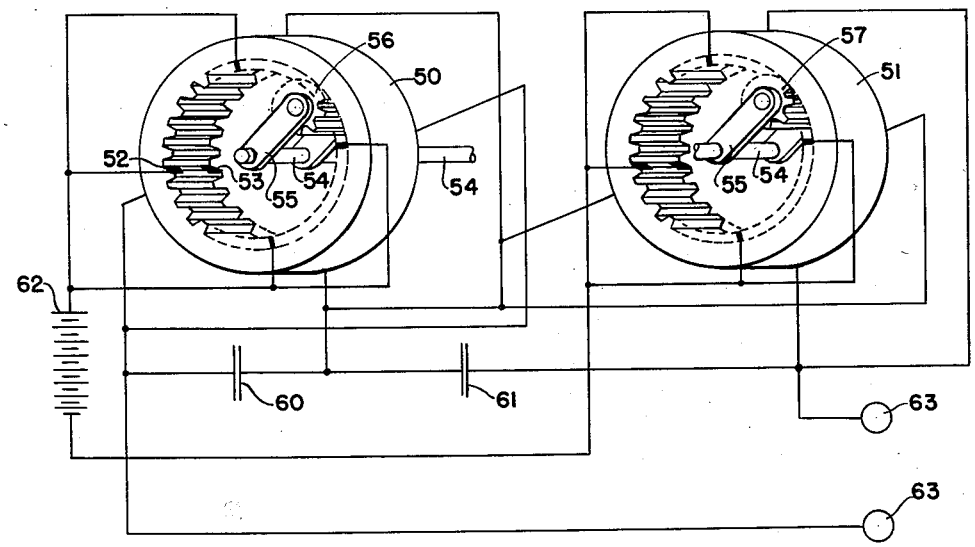
Fig. 8 is a schematic diagram of connections showing an alternate form of gear commutator.
Figure 9:
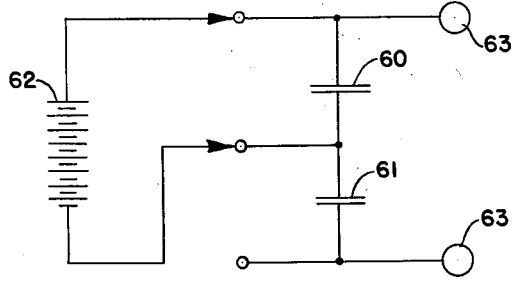
Fig. 9 is a schematic diagram of connections similar to Fig. 8, but showing a simplified contact device.
Figure 10:
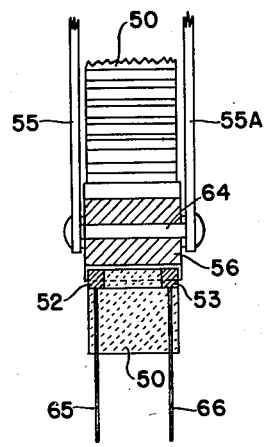
Fig. 10 is a cross sectional view of the ring gear of Fig. 8.

Another type of gear commutator is shown in Figs. 8 and 10. A ring gear 50, 51, made of insulating material, is used with two conducting inserts 52, 53 set in each contacting tooth. A central shaft 54 carries arms 55 and conducting pinions 56 and 57, which are rotated past the contact-making teeth and charge capacitors 60 and 61 to the full voltage of battery 62. The output voltage is delivered to two terminals 63 which may be connected to a load circuit. Such an arrangement is useful because it requires only half the number of ring gears as compared to the type shown in Fig. 5. The type shown in Fig. 8 is suitable for low voltages and the conducting inserts may be placed in alternate teeth, thereby increasing the available current at the output terminals.

Fig. 10 shows the detailed structure of the planetary pinion gear 56 mounted on short shaft 64. In this view the conducting inserts 52 and 53 are shown with conducting leads 65 and 66 supported in the body of the insulating ring gear 50.

A plurality of planet gears can be used to increase the frequency of the switching cycle. For example, four planet gears may be mounted on four arms 55, all turned by a central shaft 54. This multiplies the frequency by four and makes a well-balanced and stable mechanical unit.

The high voltage, low current power made available by the disclosed transformer may be used to operate television receiving tubes or infrared sensitive devices. The transformer starts to deliver its rated voltage and current soon after the contacting cycle of operations is begun and the polarity of the resulting transformation is always in accordance with the predetermined polarity.

Various combinations of stages can be used to obtain the required voltage increase or decrease. For example, a first stage employing four capacitors and four contact positions may be used with a second stage of five capacitors and five contact positions. The result will be a ratio of 4×5 or 20 for the open circuit output voltage as compared to the voltage of the source.

In the above example nine capacitors used in two stages produced a voltage ratio of 20. In the previous example, as illustrated by the drawings, nine capacitors used in three stages produced a voltage ratio of 27. It can be shown mathematically that three capacitors per stage produces the greatest possible voltage ratio.

While there have been described and illustrated specific embodiments of the invention, it will be obvious that various changes and modifications may be made therein without departing from the field of the invention, which should be limited only by the scope of the appended claims.

I claim:

1. A direct current transformer comprising, a primary circuit containing a source of electrical energy connected to two contacts; a plurality of secondary circuits arranged in series order for sequential charging, each containing a plurality of capacitors arranged in series, each of said capacitors connected to two input contacts, and an output circuit containing the capacitors in series with two output contacts; rotating mechanical switching means for sequentially connecting the primary circuit contacts to the input contacts of the next succeeding secondary circuit; and rotating mechanical means for sequentially connecting the secondary output contacts of intervening secondary circuits to the input contacts of the following secondary circuits.

2. A direct current transformer comprising, a primary circuit containing a source of electrical energy connected to two output contact brushes; a plurality of secondary circuits arranged in series order for sequential charging; each of said secondary circuits containing a plurality of capacitors arranged in series with two output contact brushes and having two input contact brushes for each capacitor, a rotating mechanism including two conducting rings for each secondary circuit for making sequential connections between the output contact brushes of one secondary circuit and the input contact brushes of the next following secondary circuit.

3. A direct current transformer comprising, a primary circuit containing a source of electrical energy connected to two output contact brushes, a terminal circuit containing a plurality of capacitors with input contact brushes and containing an output circuit which includes all of said capacitors in series with two output terminals, and a plurality of secondary circuits arranged in series order between the primary circuit and the terminal circuit; each of said secondary circuits containing a plurality of capacitors arranged in series with two output contact brushes and having two input contact brushes for each capacitor, a rotating mechanism for making sequential connections between the output contact brushes of each circuit and the input contact brushes of the next following circuit.

4. A direct current transformer comprising, a primary circuit containing a source of electrical energy connected to two output contact brushes, a terminal circuit containing a plurality of capacitors with input contact brushes and containing an output circuit which includes all of said capacitors in series with two output terminals, and a plurality of secondary circuits arranged in series order between the primary circuit and the terminal circuit; each of said secondary circuits containing a plurality of capacitors arranged in series with two output contact brushes and having two input contact brushes for each capacitor, a rotating mechanism including two conducting rings for each secondary circuit for making sequential connections between the output contact brushes of one secondary circuit and the input contact brushes of the next following circuit.

5. A direct current transformer comprising, a primary circuit containing a source of electrical energy connected to two output contacts, a plurality of secondary circuits arranged in series order for sequential charging, each of said secondary circuits containing a plurality of capacitors arranged in series with two output contacts and having two input contacts for each capacitor, a series of rotating cams for making sequential connections between the output contacts of one secondary circuit and the input contacts of the next following circuit.

6. A transformer for increasing the voltage of a direct current source comprising, a pair of output contacts for connnecting the direct current source to a plurality of secondary capacitors, one at a time, for charging each of the capacitors to the potential of the direct current source, a secondary output circuit which includes all of the secondary capacitors in series with a pair of output contacts, a terminal circuit which includes a plurality of terminal capacitors with switching means for connecting them, one at a time, to the secondary output circuit, a terminal output circuit which includes all the terminal capacitors in series with a pair of output terminals, and mechanical switching means for sequentially making said connections to apply the increased voltage to the output terminals.

7. A direct current transformer comprising, a primary circuit containing a source of electrical energy connected to two conducting gears, a plurality of secondary circuits arranged in series order for sequential charging, each of said secondary circuits containing a plurality of capacitors arranged in series with two additional conducting gears and having a series of input contact points for each capacitor arranged on an insulated ring gear which meshes with said conducting gears, means for rotating said conducting gears in mesh with the ring gears for making sequential connections between the conducting gears of one secondary circuit and the input contacts on the ring gear of the next following circuit.

8. A direct current transformer comprising, a primary circuit containing a source of electrical energy connected to two conducting gears, a secondary circuit containing a plurality of capacitors, each of said capacitors connected to two contacts set in an insulated ring gear, mechanical rotating means for sequentially connecting the source contacts to the capacitor contacts by rolling engagement of the conducting gears with the ring gears, and an output circuit which contains said capacitors in series with a set of terminals for connection to a load circuit.

9. A direct current transformer comprising, a primary circuit containing a source of electrical energy connected to two output conducting gears, a terminal circuit containing a plurality of capacitors with input contact points and containing an output circuit which includes all of said capacitors in series with two output terminals, and a plurality of secondary circuits arranged in series order between the primary circuit and the terminal circuit; each of said secondary circuits containing a plurality of capacitors arranged in series with two output conducting gears and having two input contacts for each capacitor set in an insulating ring gear, a rotating mechanism for turning all of said conducting gears in mesh with the ring gears for making sequential connections between the output conducting gears of each circuit and the input contacts of the next following circuit.

BURTON F. B. SMITH.

REFERENCES CITED

The following references are of record in the file of this patent:

UNITED STATES PATENTS

| Number | Name | Date |
|---|---|---|
| 1,508,162 | Chubb | Sept. 9, 1924 |
| 1,553,363 | Chubb | Sept. 15, 1925 |
| 1,829,897 | Houck | Nov. 3, 1931 |
| 1,992,908 | Cockroft et al. | Feb. 26, 1935 |